US005394176A

United States Patent [19]

Itaya et al.

[11] Patent Number: 5,394,176

[45] Date of Patent: Feb. 28, 1995

[54] ELECTROSTATIC PRINTING APPARATUS

[75] Inventors: Masahiko Itaya; Hiroyuki Nakagoshi; Tsutomu Sasaki, all of Tokyo, Japan

[73] Assignee: Nippon Steel Corporation, Tokyo, Japan

[21] Appl. No.: 36,211

[22] Filed: Mar. 23, 1993

[30] Foreign Application Priority Data

Mar. 24, 1992 [JP] Japan .................................. 4-097011
Mar. 24, 1992 [JP] Japan .................................. 4-097012

[51] Int. Cl.[6] ...................... G01D 15/06; G03G 15/01; G03G 15/04

[52] U.S. Cl. .................................... 347/128; 347/156; 347/115; 430/69

[58] Field of Search .................. 346/159, 157; 430/58, 430/69, 126

[56] References Cited

U.S. PATENT DOCUMENTS 3,715,762 2/1973 Magill et al. .
3,742,516 6/1973 Cavanaugh et al. .
4,463,363 7/1984 Gundlach et al. .
4,524,371 6/1985 Sheridon et al. .
4,538,163 8/1985 Sheridon .
4,686,163 8/1987 Ng et al. ................................ 430/47
5,093,689 3/1992 Imaeda et al. .................. 430/126 X
5,108,865 4/1992 Zwaldo et al. ...................... 430/126

FOREIGN PATENT DOCUMENTS 2-38070 of 0000 Japan .

*Primary Examiner*—George H. Miller, Jr.
*Attorney, Agent, or Firm*—Pollock, Vande Sande & Priddy

[57] ABSTRACT

An electrostatic printing apparatus is arranged to generate an electrostatic latent image on an image supporting medium having an insulating releasing layer and a resin thin film layer formed successively on an electrically conductive substrate, to generate a toner image on the resin thin film layer by developing the electrostatic latent image with a toner solution, and to transfer the toner image together with the resin thin film layer to a recording medium by superposing the recording medium on the resin thin film layer of the image supporting medium with the toner image formed on the resin thin film layer and pressing and heating at a temperature higher than the glass transition temperature of the resin thin film layer.

11 Claims, 5 Drawing Sheets

FIG. I

ELECTROSTATIC PRINTING APPARATUS

CROSS-REFERENCE TO THE RELATED APPLICATION

This invention is related to U.S. patent application Ser. No. 029,649 filed on Mar. 11, 1993 based on Japanese patent applications Nos. 4-89411 and 4-89412 both filed on Mar. 13, 1992. The disclosure of the U.S. Patent application is incorporated in this application by reference.

BACKGROUND OF THE INVENTION

1. Field of the Invention

This invention relates to an electrostatic printing apparatus, and particularly to an apparatus for electrostatically printing images on a specific recording medium by a liquid developing process.

2. Description of the Related Art

In the conventional color image printing process by electronic photography, generally an electrostatic latent image of the original is formed on a photosensitive medium by a laser exposure system, and developed by the dry developing method using toner powder, and this developed toner image is electrostatically transferred onto a sheet. This conventional system employs the dither method wherein the desired tone grading of an image, particularly, color image to be reproduced is approximated by the adjustment of the density of binary dots. This system, however, has a problem in that it is difficult to reproduce smooth tones and that the resolution is reduced when the tone is to be reproduced with high fidelity. In addition, since toner powder of 7–10 μm in diameter are used for developing the electrostatic latent image, the minimum size of the dots as reproduced is limited, and thus the resolution is also limited. As a result, it is difficult to obtain satisfactory tone grading and resolution.

There is another electrostatic latent image forming method in which the electrostatic latent image of a dot pattern showing an image to be reproduced is formed by ion flow, and the amount of ion flow for each dot of the dot pattern is controlled to achieve a desired tone grading of the reproduced image. This method or apparatus is disclosed in, for example, U.S. Pat. Nos. 3,715,762; 3,742,516; and 4,463,363. In addition, there is a liquid developing method using a solution of toner for developing latent images with high fidelity. This liquid developing method can reproduce a high-quality image since it uses smaller-diameter toner particles than the dry developing method. The combination of the electrostatic latent image forming method using ion flow and the liquid developing method can reproduce an extremely high-quality image as compared with the conventional electronic photography.

In this combined method, however, it is fundamentally difficult to satisfactorily transfer the image to ordinary paper due to the electric characteristics of toner and the powder characteristics of toner particles contained in the toner liquid. Therefore, the so-called direct recording system is widely used in which the reproduced image is formed on electrostatic recording paper which is produced by coating an insulating layer on a conductive base paper, or substrate as disclosed in, for example, "Single Path Color Electrostatic Block 2010 Series" written by Naoya Matsuda, Nippon Steel Technical Report, No. 341, Annex, Sept. 1992.

In another system, as disclosed in U.S. Pat. No. 4,686,163, a special transfer material is coated on a photosensitive medium to form a transfer sheet, and the toner image developed on the transfer sheet is transferred to ordinary paper. In this method, the electrostatic latent image can be formed by an exposure process similar to the conventional electronic photography, but it must be formed on a transfer sheet of a complicated structure having a transfer function.

Thus, the conventional electronic photography has difficulty in satisfying both high resolution and faithful tone grading. In addition, the image printing method, or the combination of the ion flow electrostatic latent image forming process and the liquid developing process encounter difficulty in satisfactory transfer. Moreover, in the method using electrostatic recording paper which is formed by coating an insulating layer on a conductive base of paper, a high-quality reproduced image can be obtained by a simple mechanical arrangement, but the image receiving paper on which the reproduced image is formed is limited.

SUMMARY OF THE INVENTION

Accordingly, it is an object of the invention to provide an electrostatic printing apparatus of a small size and simple construction which allows to use a variety of image-receiving paper sheets selectively according to the purpose of using it, and transferring on this paper sheet the image obtained by developing the electrostatic latent image while the image-receiving paper sheet is maintained to have its visual and actual feeling.

In order to achieve the above object, according to one aspect of the present invention, there is provided an electrostatic printing apparatus comprising means for generating an electrostatic latent image on an image supporting medium which has an insulating releasing layer and a resin thin film formed successively on an electrically conductive substrate, means for generating a toner image on the resin thin film by developing the electrostatic latent image with a toner solution, and means for transferring the toner image together with the resin thin film to a recording medium by superimposing the recording medium on the resin thin film of the image supporting medium having the toner image formed thereon and applying a pressure thereto while heating at a temperature higher than the glass transition temperature of the resin thin film.

According to another aspect of the present invention, there is provided an electrostatic printing apparatus having image supporting medium supplying means for selectively supplying one of a first image supporting medium which has an insulating releasing layer and a peel-off layer formed successively on an electrically conductive substrate and a second image supporting medium which has an insulating resin layer formed on an electrically conductive substrate, means for generating an electrostatic latent image on the selected image supporting medium as supplied from the image supporting medium supplying means, means for developing the electrostatic latent image formed on the selected image supporting medium with a toner solution so that a toner image is formed on the peel-off layer when the selected image supporting medium is the first image supporting medium and on the resin layer when the selected image supporting medium is the second image supporting medium, and fixing means for fixing the toner image by superimposing the recording medium on the peel-off layer on which the toner image is formed and applying a pressure to the superimposed recording medium and peel-off layer, while heating it at a predetermined temperature so as to fix the toner image on the peel-off layer, the fixed toner image being transferred to the recording medium together with the peel-off layer, when the selected image supporting medium is the first image supporting medium and by directly heating the second image supporting medium when the selected image supporting medium is the second image supporting medium so as to fix the toner image on the insulating layer, wherein the peel-off layer of the first image supporting medium has a glass transition temperature which is lower than the heating temperature in the fixing means, and the dielectric constant and electric resistivity of the composite layer of the releasing layer and the peel-off layer of the first image supporting medium are substantially equal to those of the second image supporting medium.

According to one aspect of the invention, an electrostatic latent image is formed on the image supporting medium, and developed with a toner solution to appear on the resin thin film. Then, the image supporting medium and the image receiving paper are superimposed on each other and a pressure is applied thereto while heating it at a temperature higher than the glass transition temperature of the resin thin film layer by the fixing means, so that the resin thin film is subjected to glass-transition. Since the releasing layer of the image supporting medium has a larger surface tension than the image receiving paper sheet, the resin thin film in the fused state together with the toner image adhere to, or are transferred to the smaller-surface-tension image receiving paper sheet, thus a print image being obtained. Since this transfer process applies not only heat but also pressure, the resin film which has been melted by heating at a temperature higher than the glass transition temperature permeates into the gaps of the fibers of the paper sheet, and the small pits and hollows of its irregular surface, so that the resin film securely adheres to the paper. Therefore, when the paper sheet is peeled off from the image supporting medium after cooling, the resin film is completely separated from the releasing layer and left as adhered, or transferred to the image receiving paper.

According to another aspect of the invention, any one of the first image supporting medium and the second image supporting medium can be selectively used. For obtaining the transferred image, the first image supporting medium is selected and the electrostatic latent image is formed on that medium. Then, the toner image is formed by developing the latent image with the toner solution. The first image supporting medium with the toner image is superimposed on the image receiving paper sheet, and pressed with heating at a predetermined temperature by the fixing means. Since the fixing temperature is higher than the glass transition temperature of the peel-off layer of the first image supporting medium, the peel-off layer is melted and adheres to the image receiving paper together with the toner image, or transferred to the paper. For directly printing the image without using the image receiving paper sheet, the second image supporting medium with the insulating resin layer formed on the conductive substrate is selected and the electrostatic latent image is formed on the resin layer. The latent image is developed with the toner solution to form the toner image, and the toner image is fixed by the fixing means, thus the print image being obtained.

DESCRIPTION OF THE PREFERRED EMBODIMENTS

The first embodiment of the invention will be described with reference to FIGS. 1 to 4.

Figure 1:
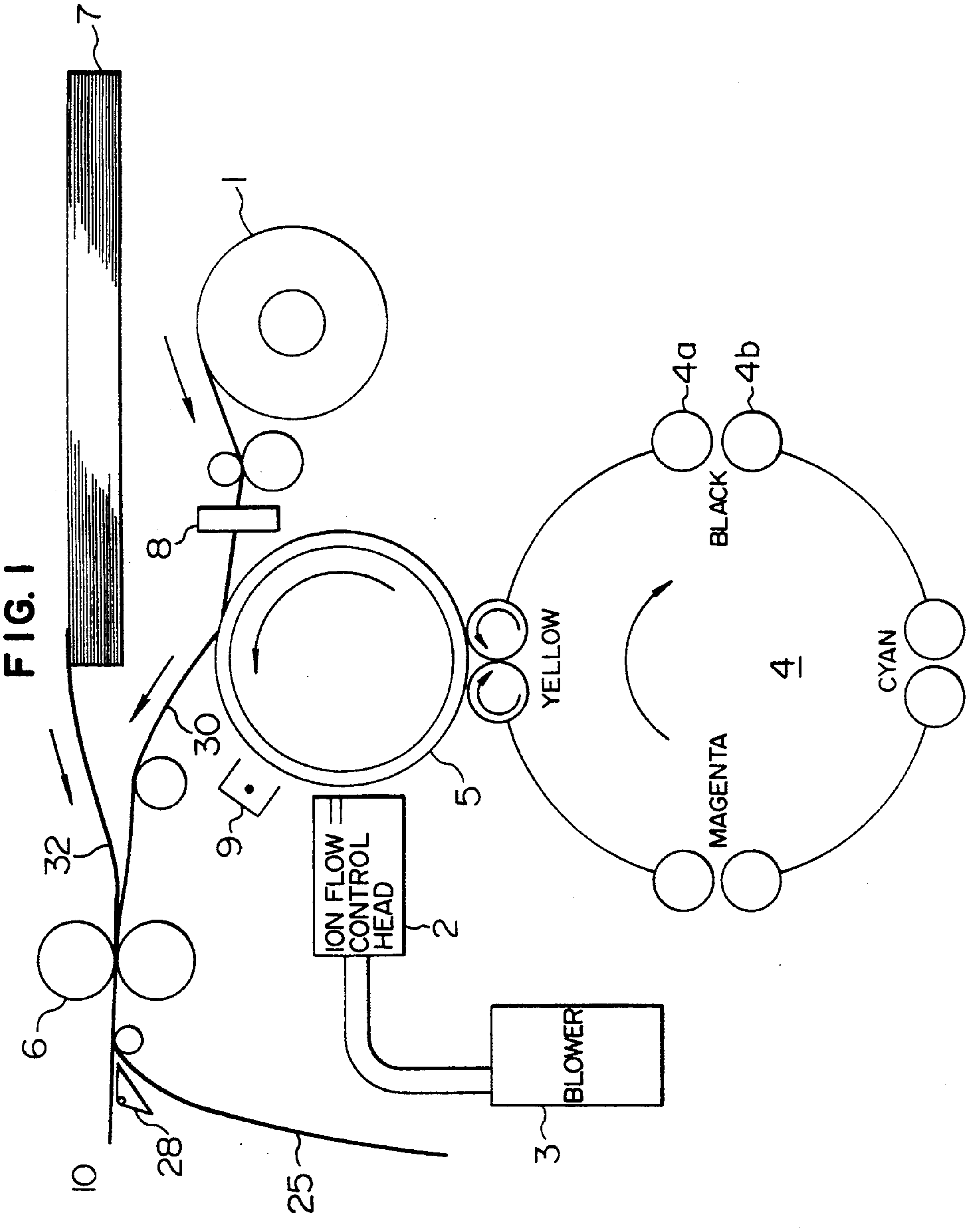
FIG. 1 is a diagram of the electrostatic printing apparatus according to one embodiment of the invention.

FIG. 1 shows the construction of the electrostatic color printer according to the first embodiment of the invention. Referring to FIG. 1, 1 is a transfer sheet roll as a roll of the image supporting medium, or transfer sheet 30, 2 is an ion flow type electrostatic head for controlling the ion flow so as to form a latent image on the transfer sheet, 3 is a blower for supplying air to this head, 4 is a developing device group for developing the electrostatic latent image, 4*a* is a developing roller, 4*b* a scraper roller, 5 a winding drum which rotates for winding the image supporting medium, 6 a thermal transfer device for applying heat and pressure to image receiving paper sheet 7 laminated on the image supporting medium, and and 8 is a cutter for cutting the transfer sheet into a proper size. In some case, a preelectrifier 9 is used for electrifying the transfer sheet in advance.

Figure 2:
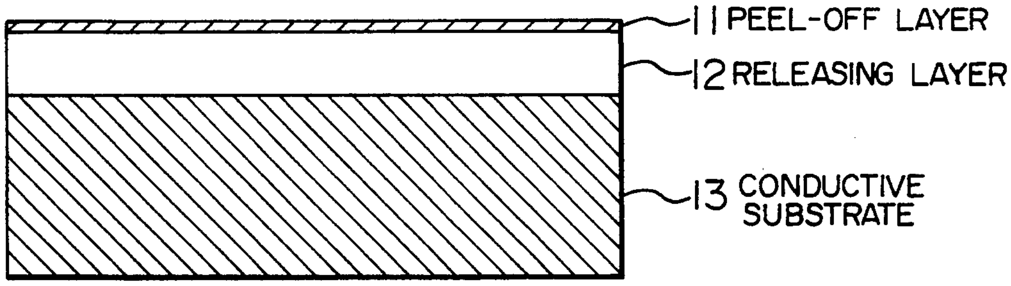
FIG. 2 is a cross-sectional diagram of the structure of the image supporting medium used in the apparatus of FIG. 1.

FIG. 2 shows an example of the transfer sheet as the image supporting medium. In FIG. 2, numeral 13 represents a conductive substrate, 12 a releasing layer formed thereon, and 11 is a peel-off layer of a resin thin film formed on the releasing layer. The releasing layer 12 and the conductive substrate 13 are bonded to each other with sufficient adhesion by an adhesive coated on one of the releasing layer and the conductive substrate. The peel-off layer 11 may be made of a resin such as polyester, phenyl resin, acrylic resin, vinyl polymer, cellulose or polyvinyl acetate. The releasing layer 12 may be formed by coating a substance of a large surface tension such as silicone resin or fluororesin on the surface of the conductive substrate 13.

Figure 3:
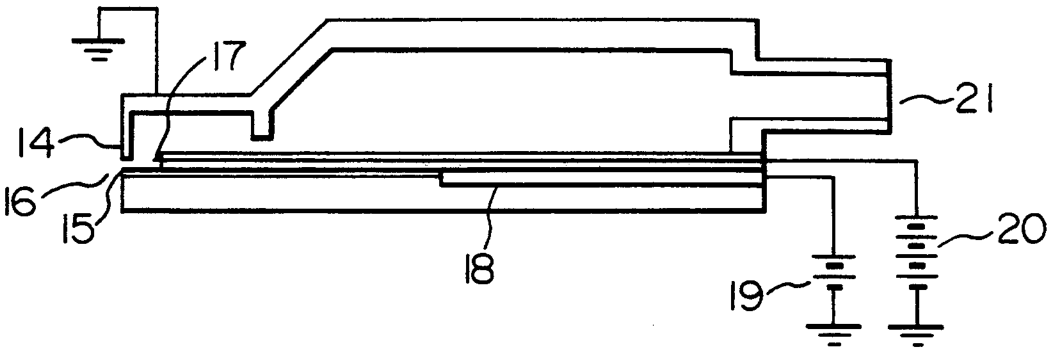
FIG. 3 is a diagram of the structure of the ion flow control head for forming an electrostatic image.

FIG. 3 is a diagram of the ion flow type electrostatic head. In FIG. 3, there are shown an opposing electrode 14, a control electrode array 15 having a large number of control electrodes, and a slit 16 from which the controlled ion flow is ejected out. Also, there are shown a discharge electrode 17 for generating ions, a control driver 18 for selectively applying a voltage to the control electrodes, a control power supply 19, a high-voltage source 20 for electric discharge, and an air flow inlet 21.

Figure 4:
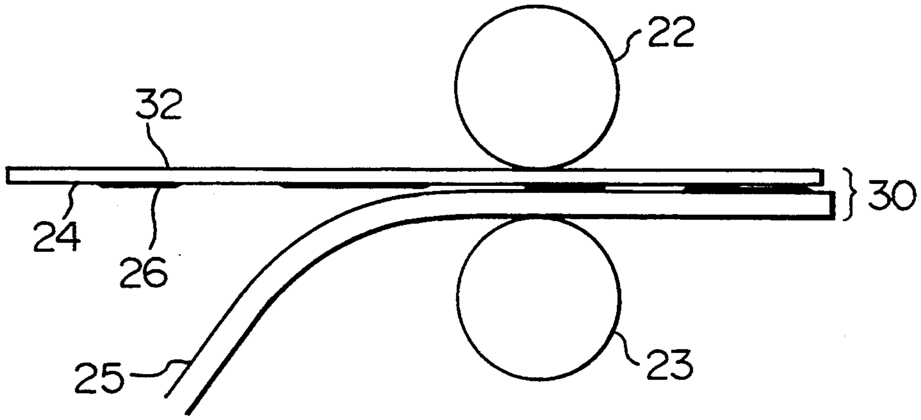
FIG. 4 is a diagram of the transfer mechanism of the apparatus of FIG. 1.

FIG. 4 shows the transfer mechanism of the thermal transfer device 6. In the figure, 22 is a heat roll for heating, 23 is a backup roll for pressure-application, 24 is a peel-off layer of the transfer sheet 30, 25 is a composite layer of the substrate and the releasing layer after the peel-off layer has been transferred to the image receiving paper sheet, 26 is a transferred toner layer, and 32 is the image receiving paper sheet.

The operation will be described below.

First, the transfer sheet is drawn out of the transfer sheet roll 1, cut into a predetermined size by the cutter 8, and fixed on the winding drum 5. The electric charge on the transfer sheet is removed by supplying an AC voltage thereto by the preelectrifying electrode 9 or the surface of the sheet is electrified to have a predetermined surface potential by supplying a DC or DC+AC voltage thereto by the electrode. As a result, the surface of the transfer sheet is given uniform electric charge of an opposite polarity to that of the electrostatic latent image, at a surface potential higher than that of the electrostatic latent image.

Then, an electrostatic latent image is formed on the transfer sheet by the ion flow control head 2. This head is operated as follows. As shown in FIG. 3, a high voltage is applied to the discharge electrode 17 to cause corona discharge, thus generating a large amount of ions. A high-speed air flow is introduced into this space so that a part of the generated ions is emitted as a jet flow together with the air flow from the slit 16. Therefore, an ion flow at a constant speed is generated at the slit, and its direction is changed by the electric field produced at the slit 16 by each electrode of the control electrode array 15 and the opposing electrode 14 so as to control the amount of ions directed toward the surface of the image supporting medium.

Various types of the ion flow control heads are known as disclosed in, for example, Japanese Patents JP-A-59-164154, JP-A-59-190854 and JP-A-2-38070. Although any one of them may be used in this invention, such head is preferable as disclosed in U.S. patent application Ser. No. 029,649 entitled "Electrostatic Recording Head" and filed by the inventors of this application on Mar. 11, 1993 based on Japanese patent applications Nos. 4-89411 and 4-89412 both filed on Mar. 13, 1992. The disclosure of the U.S. Patent application is incorporated in this application by reference.

The electrostatic latent image thus formed is developed by the developing device 4. The developing device comprises a developing roller 4*a* and a scraper roller 4*b* each rotating in a direction as indicated by an arrow in FIG. 1. The electrostatic latent image is developed with a toner solution including an organic solvent and toner and carried by the developing roller to the developing region. At this time, since the organic solvent as well as the toner are attached to the transfer sheet, it is necessary to remove excessive solvent as possible and return it to the developing device in order to evaporate the organic solvent as soon as possible. For this purpose, the scraper roller 4*b* is used. This roller 4*b* rotates close to the transfer sheet at a high speed. In case of color printing, four different toner liquid developers are provided for color components, yellow, Magenta, Cyan and black. First, an electrostatic latent image is formed for the yellow component of the print image and developed with the yellow developer. Similarly, electrostatic latent images for the Magenta, Cyan and black components are formed and developed with the corresponding developers, thus producing a color toner image.

Then, the developed transfer sheet is peeled off from the winding drum by a nail-like peeler, superposed on the image receiving paper 7, and passed through the thermal transfer device 6. This thermal transfer device 6 is substantially the same as the fixing device used in the usual copying machine. The image receiving paper sheet 7 may be the so-called ordinary paper sheet, Japanese paper sheet and cloth sheet so long as it can be passed through the thermal transfer device 6. The peel-off layer 11 of the transfer sheet as pressed and heated at a temperature of 150° through 200° C. by the thermal transfer device 6 is melted and adheres to the image receiving paper sheet 7. At this time, the transfer sheet is separated into the peel-off layer 11 and a composite layer of the releasing layer 12 and the conductive layer by the peeler 28. The toner image is transferred to the image receiving paper sheet together with the peel-off layer. The peel-off layer 11 has a thickness of 1 through 3 μm, and thus gives almost no affect on the touch feeling of the image receiving paper sheet. In this way, a sequence of processes are completed.

The image supporting medium and the image receiving paper sheet are superposed on each other and pressed with heating at a temperature higher than the glass transition temperature of the resin thin film by the fixing device, so that the peel-off layer 11 on the surface of the image supporting medium is subjected to glass transition. Since the releasing layer 12 has a surface tension larger than that of the image receiving paper sheet, the peel-off layer 11 which is in the form of the melted resin thin film, adheres to, or is transferred to the image receiving paper sheet having a smaller surface tension together with the toner layer, thus completing a color print. Since application of not only heat but also pressure is performed in this transfer process, the resin layer heated to a temperature higher than the glass transition temperature so as to be in a melted state permeates into the gaps of the fibers of the paper sheet, and small pits and hollows of its irregular surface, so that the resin layer securely adheres to the paper sheet. Therefore, when the paper sheet is peeled off from the image supporting medium after cooling, the peel-off layer 11 is completely separated from the releasing layer 12 and well transferred to the image receiving paper sheet 7.

An example of the result of examining the layered structure of the transfer sheet is shown in Table I.

TABLE I

| | Test 1 | Test 2 | Test 3 |
|---|---|---|---|
| Thickness of substrate (μm) | 60 | 60 | 100 |
| Resistivity (Ω · cm) | $10^6$–$10^8$ | $10^6$–$10^8$ | $10^{10}$–$10^{12}$ |
| Thickness of releasing layer (μm) | 20 | 10 | 10 |
| Thickness of peel-off layer (μm) | 8 | 1.5 | 1.5 |
| Thickness of image receiving paper sheet (μm) | 80 | 80 | 80 |
| Picture quality | Δ | ∘ | x |
| Transferability | ∘ | ∘ | Δ |
| Fixability | ∘ | Δ | Δ |
| Appearance of image receiving paper sheet | Δ | ∘ | ∘ |

From this result, it will be seen that for good images it is necessary to make lower the resistance and thinner the thickness of the substrate and make thinner the thickness of the releasing layer. In order to improve the transferability and fixability, the peel-off layer is preferably made thicker, but since the appearance of the paper sheet tends to become poor, it is necessary to be optimized. Although the parameters should be determined in association with the thermal transfer device 6, the values near the data shown on the table will be appropriate. However, since the conditions are naturally different depending on the characteristics of the used materials, the parameters should be selected on the basis of the experimental results. The developer to be used in this embodiment is a toner solution that is prepared by dispersing toner particles have a diameter of about 0.1 μm diameter in a typical organic solvent, Exxon's Isopar G^TM^.

The ion flow control head 2 may be any one of the many types proposed so far. In addition, the winding drum 5 may be of any other than the drum type, for example, a combination of rollers as long as the image can be formed at a proper position with good reproducibility.

Thus, according to this embodiment, since the electrostatic printing apparatus has the ion flow controller, the image supporting medium including the releasing layer and the extremely thin peel-off layer formed on the conductive substrate, the developing device for developing the electrostatic latent image formed thereon with a liquid developer, and the thermal transfer device, and since the toner image is transferred together with the peel-off layer by superimposing the image receiving paper sheet on the image supporting medium and pressing while heating them, the developing mechanism and transfer mechanism can be simplified as compared With the conventional electronic photograph type color printer. In addition, color hard copies can be obtained with high resolution and excellent tone grading. Moreover, since the peel-off layer as used is extremely thin, the appearance of image receiving paper sheet hardly becomes poor when the image has been transferred and many different kinds of paper sheets can be used. While the embodiment of the invention has been explained in a case as applied to a color printer, this invention can be naturally applied to a monochrome printer.

Figure 5:
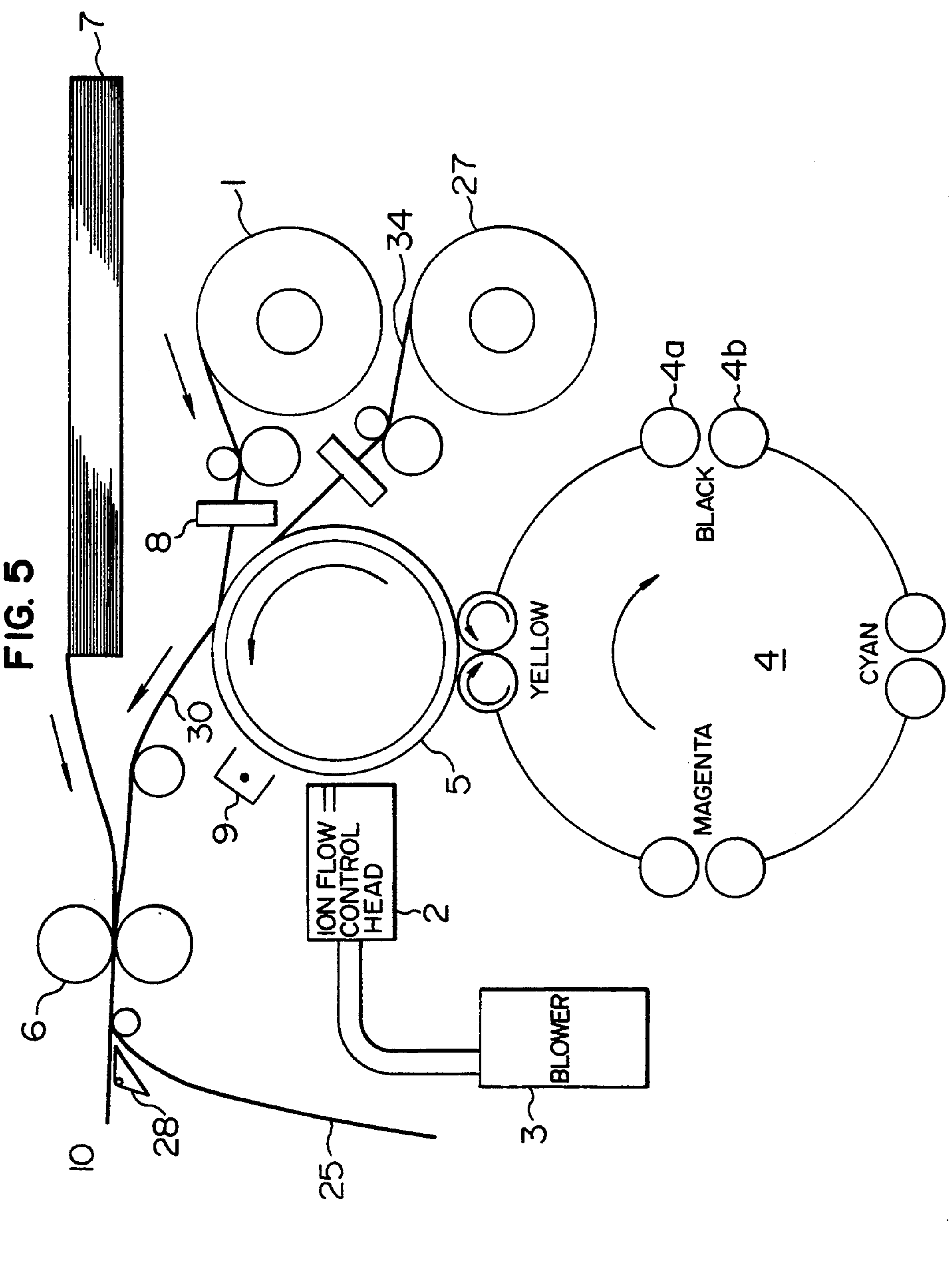
FIG. 5 is a diagram of the electrostatic printing apparatus of another embodiment of the invention, when used with the image supporting medium for image transfer.
Figure 6:
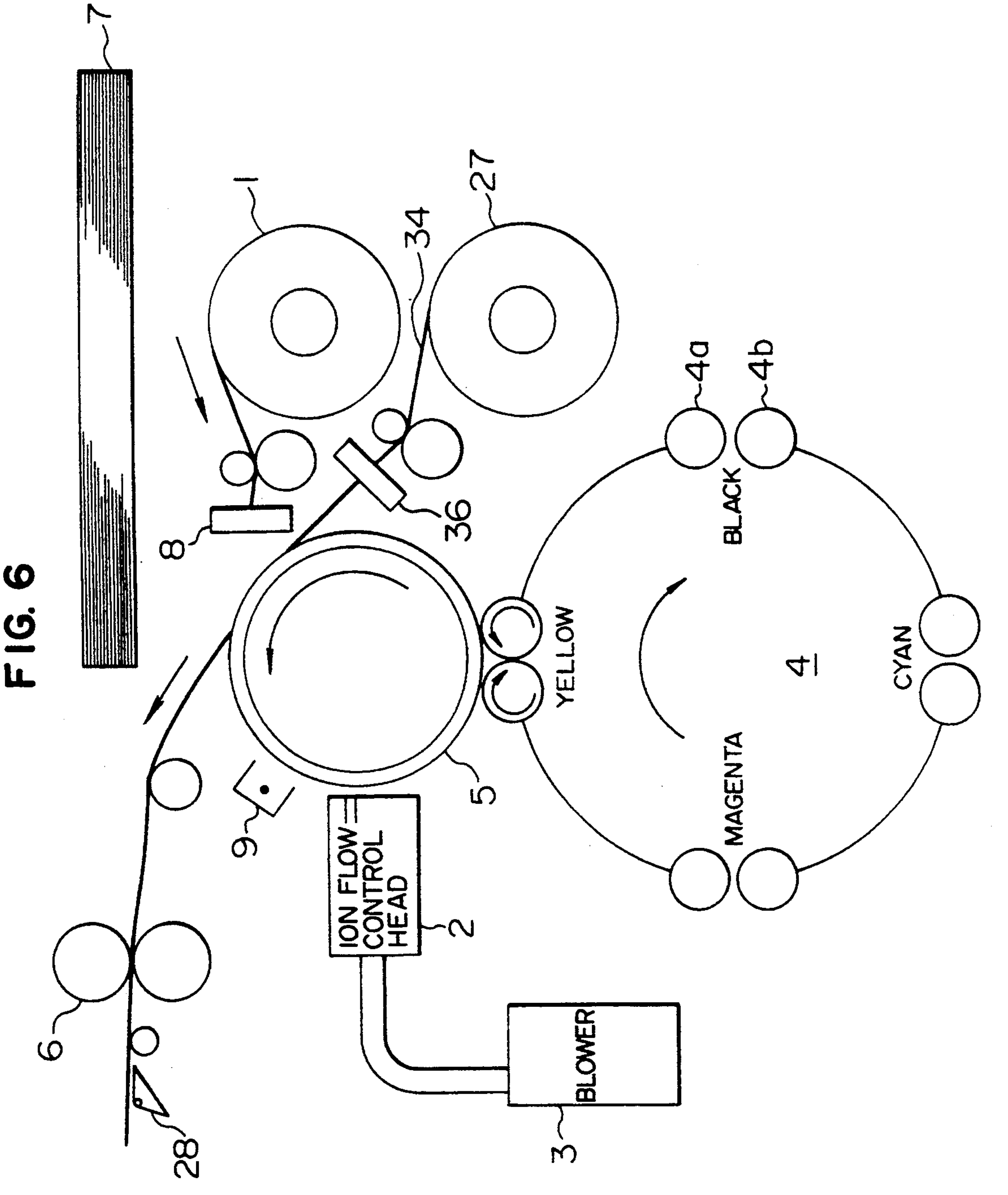
FIG. 6 is a diagram of the electrostatic printing apparatus of the embodiment of FIG. 5 of the invention, when used with the electrostatic recording paper sheet.

The second embodiment of the invention will be described with reference to FIGS. 5 to 7. The second embodiment is arranged to use selectively any one of a transfer sheet having the releasing layer and the peel-off layer formed on the conductive substrate and an electrostatic recording paper sheet for direct printing. When the transfer sheet is used, the second embodiment is fundamentally the same as the first embodiment. The second embodiment is different from the first embodiment in that an electrostatic recording paper roll 27 is provided for supplying the electrostatic recording paper sheet 34 as shown in FIG. 5. FIG. 5 shows a construction of the second embodiment, when using the transfer sheet. The transfer sheet is selected from the transfer sheet roller 1 and fed to the electrostatic latent image generator, while the operation of the electrostatic recording paper roller 27 is stopped. The operations of the electrostatic latent image generator and developing device are the same as in the first embodiment, and will not be described.

Figure 7:
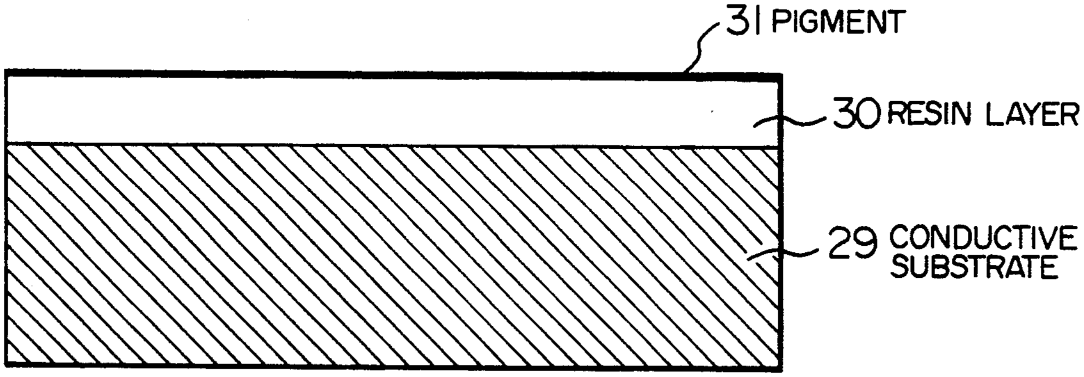
FIG. 7 is a cross-sectional diagram of the structure of the electrostatic recording paper sheet.

The electrostatic recording paper sheet, as shown in FIG. 7, is formed by coating a resin layer 30 and pigment 31 on a conductive substrate 29. The pigment is used for the background color of the recording paper sheet. When the electrostatic recording paper sheet 34 is used as shown in FIG. 6, the electrostatic recording paper is fed out from the electrostatic recording paper roll 27 and cut to a sheet of a proper size by a cutter 36 (it is possible to commonly use the cutter 8). The cut paper sheet is wrapped and held on the winding drum 5. The following image production process is the same as that in the use of the transfer sheet.

The electrostatic recording paper sheet 34 with a toner image formed thereon is peeled off from the winding drum 5 and fed to the thermal transfer device 6, where it is heated so that the toner image is fixed on the electrostatic recording paper sheet.

When the electrostatic latent image is formed on a selected one of the transfer sheet and the electrostatic recording paper sheet in this embodiment, it is necessary to control the ion flow control electrode in accordance with the electric characteristics of the selected sheet. Since a complicated control of the parameters is normally necessary when the control electrode is adjusted in accordance with the characteristics of the sheet, the electric resistance and dielectric constant of the composite lamination of the releasing layer and the peel-off layer of the transfer sheet are adjusted to substantially equal to those of the composite lamination of the resin and pigment of the commonly used electrostatic recording paper sheet. In other words, the resistivity of the substrate is in a range of $10^4$ through $10^8$ Ω-cm, and the resistivity and the dielectric constant of the composite lamination are in $10^{14}$ through $10^{16}$ Ω-cm and 1.5 through 3.0, respectively, on the basis of the transfer sheet of 100±20 μm in thickness. Thus, the control for the control electrode can be simplified.

In this second embodiment, the transfer sheet can be processed in the same way as in the first embodiment, and the electrostatic recording paper can be used. When the electrostatic recording paper is used, the variety of the materials for the paper is small, but a high-quality print can be obtained at low cost and at high speed. Since this second embodiment can selectively use the transfer sheet and the electrostatic recording paper, a wide-purpose printer can be achieved with a simple construction.

What is claimed is:

1. An electrostatic printing apparatus comprising:
- rotary means driven for rotation;
- a cut sheet of image supporting medium having a predetermined length, wound onto said rotary means to be rotated therewith, said image supporting medium including an insulating releasing layer and a resin thin film successively formed on an electrical conductive substrate;
- means for generating an electrostatic image on said cut sheet of image supporting medium wound on said rotary means as driven;
- means for generating a toner image on said resin thin film of said cut sheet of image supporting medium wound on said rotary means by developing said electrostatic latent image with a toner solution; and
- means for transferring said toner image together with said resin thin film to a recording medium by superimposing said recording medium on said resin thin film of said cut sheet of image supporting medium, said cut sheet being separated from said rotary means after development, and by applying a pressure thereto while heating at a temperature higher than a glass transition temperature of said resin thin film.

2. An electrostatic printing apparatus according to claim 1, further comprising means for uniformly providing a charge having a polarity opposite to that of said electrostatic latent image and a surface potential higher than that of said electrostatic latent image on a surface of said image supporting medium before said electrostatic latent image is formed.

3. An electrostatic printing apparatus according to claim 1, wherein said electrostatic latent image generating means includes an ion flow type electrostatic head having a slit opposing to said image supporting medium, an array of a large number of control electrodes disposed to selectively produce an electric field in said slit, ion generation means for generating ions by corona discharge and making a flow of said ions directed toward said slit and means for selectively applying a voltage to each of said control electrodes thereby producing an electric field in said slit so as to control said flow of ions passing through said slit toward said image supporting medium.

4. An electrostatic printing apparatus according to claim 3, further comprising means for uniformly providing a charge having a polarity opposite to that of said electrostatic latent image and a surface potential higher than that of said electrostatic latent image on a surface of said image supporting medium before said electrostatic latent image is formed.

5. An electrostatic printing apparatus according to claim 1, wherein said releasing layer has a thickness of 10 to 100 μm, and said resin thin film layer has a thickness of 10 μm or less.

6. An electrostatic printing apparatus comprising:

image-supporting medium supplying means for supplying at least one of:

(a) a first image supporting medium having an insulating releasing layer and a peel-off layer formed successively on an electrical conductive substrate; and (b) a second image-supporting medium having an insulating resin layer formed on an electrically conductive substrate;

rotary means driven for rotation with a cut sheet wound thereon said cut sheet having a predetermined length and including one of said first image-supporting medium and said second image-supporting medium supplied from said image-supporting medium supplying means;

means for generating an electrostatic latent image on said cut sheet of image-supporting medium wound on said rotary means as driven;

means for developing said electrostatic latent image formed on said cut sheet of image-supporting medium with a toner solution so that toner image is formed (1) on said peel-off layer when said image supporting medium is said first image supporting medium or (2) on said resin layer when said image-supporting medium is said second image supporting medium; and means for transferring said toner image together with said peel-off layer to a recording medium by superimposing said recording medium on said peel off layer of said cut sheet of image-supporting medium, said cut sheet being separated from said rotary means after development, and by applying a pressure thereto while heating when said image supporting medium is said first image supporting medium, and means for fixing said toner image formed on said resin layer by directly heating said image-supporting medium when said image supporting medium is said second image supporting medium.

7. An electrostatic printing apparatus according to claim 6 further comprising means for uniformly providing a charge having a polarity opposite to that of said electrostatic latent image and a surface potential higher than that of said electrostatic latent image on a surface of said first or second image supporting medium before said electrostatic latent image is formed.

8. An electrostatic printing apparatus according to claim 6 wherein said peel-off layer is a resin thin layer.

9. A method of generating a printed image comprising:

providing an image-supporting medium comprising in sequence, a substrate, an insulating releasing layer on said substrate, and a resin thin film on said insulating layer;

providing rotary means for rotation with a cut sheet of said image-supporting medium wound thereon;

generating an electrostatic latent image on said cut sheet of said image-supporting medium wound on said rotary means as driven;

developing the resulting latent image with a toner solution to generate a toner image;

superimposing a recording medium on said cut sheet of said image-supporting medium to transfer said toner image to said recording medium; and applying pressure to the resulting composite of recording medium and image-supporting medium while heating said composite at a temperature higher than a glass transition temperature of said resin thin film.

10. A method according to claim 9 wherein said releasing layer has a thickness of about 10 to about 100 μm and said resin thin film layer has a thickness no greater than about 10 μm.

11. A method of generating a printed image comprising:

providing an image-supporting medium having an insulating resin layer formed on an electrically conductive substrate;

providing rotary means for rotation of a cut sheet of said image-supporting medium wound thereon;

generating an electrostatic latent image on said cut sheet of said image-supporting medium wound on said rotary means as driven;

developing the resulting latent image on said image-supporting medium with a toner solution to generate a toner image; and heating the developed toner image to fix said image on said insulating resin layer.

* * * * *